(12) United States Patent
Panzer et al.

(10) Patent No.: US 11,754,165 B2
(45) Date of Patent: Sep. 12, 2023

(54) DAMPING SYSTEM AND LINEAR ACTUATOR

(71) Applicant: Ewellix AB, Goeteborg (SE)

(72) Inventors: Hans Peter Panzer, Liestal (CH); Marcel Soltermann, Liestal (CH); Bernd Spigaht, Liestal (CH)

(73) Assignee: Ewellix AB, Goeteborg (SE)

( * ) Notice: Subject to any disclaimer, the term of this patent is extended or adjusted under 35 U.S.C. 154(b) by 0 days.

(21) Appl. No.: 17/862,593

(22) Filed: Jul. 12, 2022

(65) Prior Publication Data

US 2023/0034187 A1  Feb. 2, 2023

(30) Foreign Application Priority Data

Jul. 30, 2021  (DE) ..................... 10 2021 119 937.9

(51) Int. Cl.
*F16H 57/00* (2012.01)
*F16H 25/22* (2006.01)

(52) U.S. Cl.
CPC ..... *F16H 57/0006* (2013.01); *F16H 25/2204* (2013.01)

(58) Field of Classification Search
CPC ............. F16H 57/0006; F16H 25/2204; F16H 25/2006; F16H 25/2003
USPC ................................................ 74/441, 89.42
See application file for complete search history.

(56) References Cited

U.S. PATENT DOCUMENTS

| | | | | |
|---|---|---|---|---|
| 2,919,596 A * | 1/1960 | Kuehl | ................. | F16H 25/2006 74/89.42 |
| 4,727,762 A | 3/1988 | Hayashi | | |
| 4,954,032 A * | 9/1990 | Morales | ............... | F16H 25/2006 411/289 |
| 5,467,661 A * | 11/1995 | Lange | ................. | F16H 25/2204 74/424.82 |
| 5,501,118 A * | 3/1996 | Benton | ................ | F16H 25/2209 74/89.42 |
| 5,732,596 A * | 3/1998 | Erikson | ............... | F16H 25/2006 74/89.42 |
| 5,839,321 A * | 11/1998 | Siemons | ............. | F16H 25/2006 74/89.42 |
| 6,131,478 A * | 10/2000 | Erikson | ............... | F16H 25/2006 74/89.42 |
| 6,142,032 A * | 11/2000 | Creager | .............. | F16H 25/2006 74/89.42 |
| 6,931,960 B1 * | 8/2005 | Devenyi | ............. | F16H 25/2295 74/424.77 |

(Continued)

FOREIGN PATENT DOCUMENTS

DE    102016009037 A1    1/2018
GB        1346990 A       2/1974

*Primary Examiner* — David M Fenstermacher
(74) *Attorney, Agent, or Firm* — Laurence A. Greenberg; Werner H. Stemer; Ralph E. Locher

(57) ABSTRACT

A damping system for a linear actuator, and a linear actuator. The damping system has a first sub-assembly with a first axial stop surface and a second axial stop surface. A spring-elastic spring arrangement has an initial position at a predetermined pretensioning and is axially in contact with the first and second stop surface. A second sub-assembly is mounted axially displaceable relative to the first sub-assembly and is configured to lift the spring arrangement away from the first stop surface or from the second stop surface in the case of an axial movement relative to the first sub-assembly.

18 Claims, 4 Drawing Sheets

(56) References Cited

U.S. PATENT DOCUMENTS

| | | | | |
|---|---|---|---|---|
| 2004/0093971 | A1* | 5/2004 | Fujibayashi | G11B 7/08582 |
| | | | | 74/89.42 |
| 2007/0012127 | A1* | 1/2007 | Morton | F16H 25/2006 |
| | | | | 74/89.42 |
| 2007/0258789 | A1* | 11/2007 | Bogue | F16H 25/2006 |
| | | | | 411/231 |
| 2009/0145252 | A1* | 6/2009 | Schroeder | F16H 25/2006 |
| | | | | 74/89.42 |
| 2011/0132113 | A1* | 6/2011 | Song | F16H 25/2006 |
| | | | | 74/10.85 |
| 2012/0192662 | A1* | 8/2012 | Kluge | F16H 25/2006 |
| | | | | 74/89.17 |
| 2013/0019706 | A1* | 1/2013 | Cronin | F16H 25/2006 |
| | | | | 74/441 |
| 2022/0356932 | A1* | 11/2022 | Lin | F16H 25/2204 |

* cited by examiner

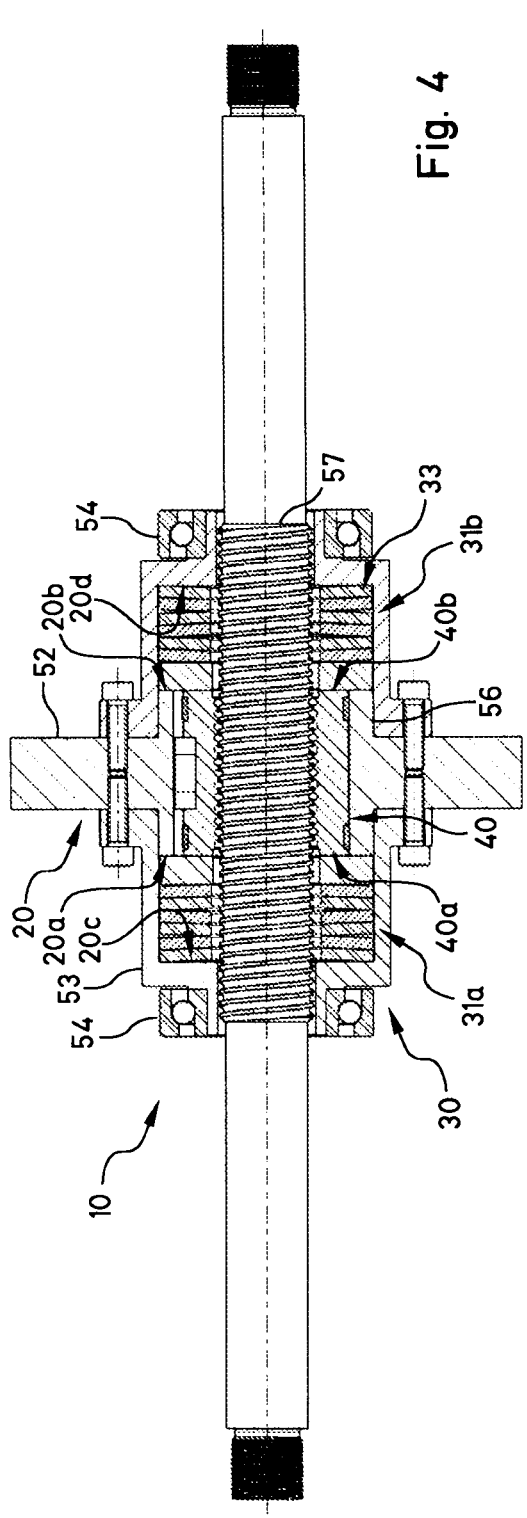
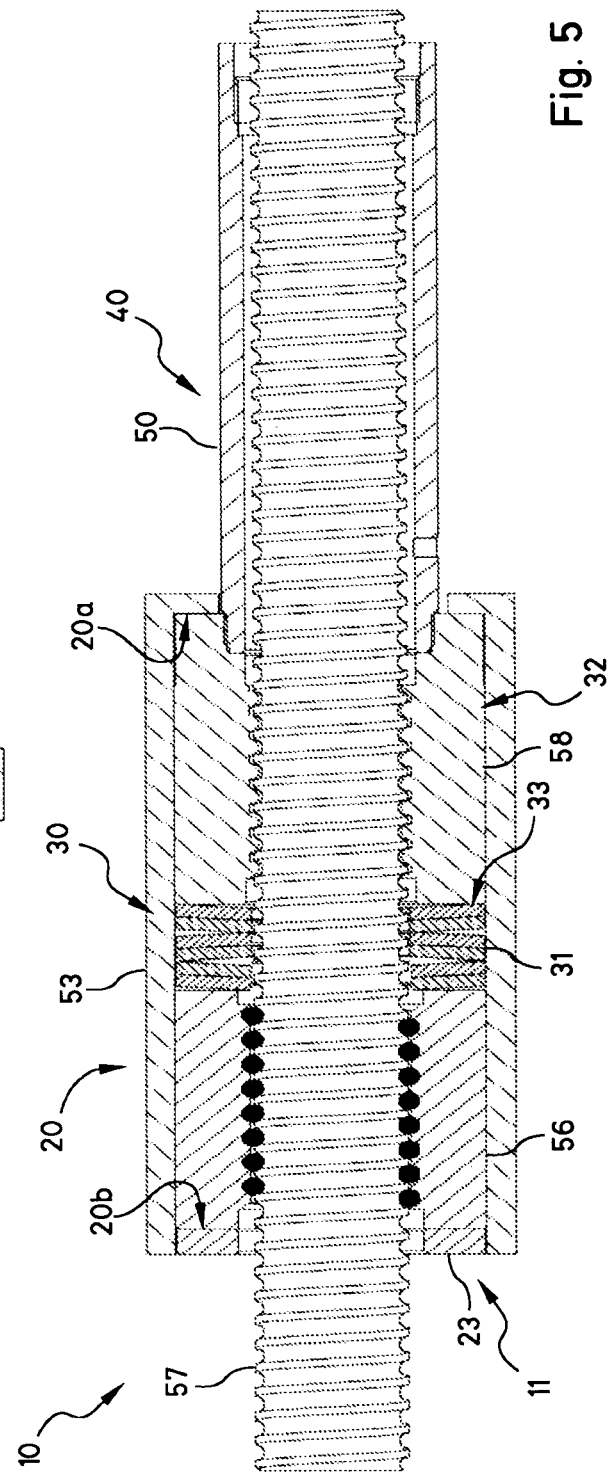

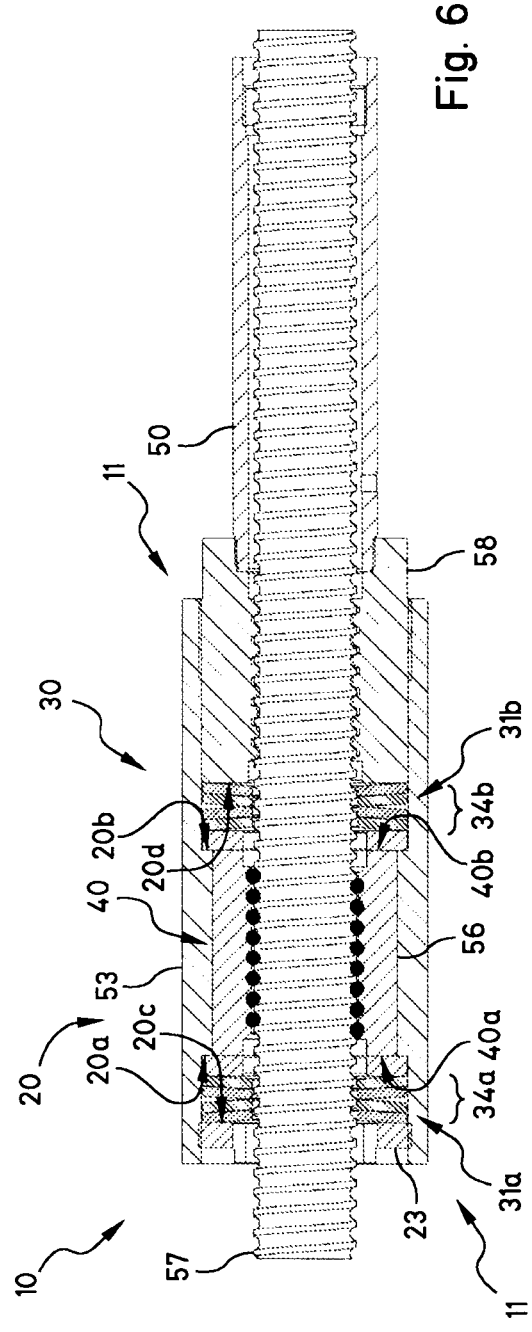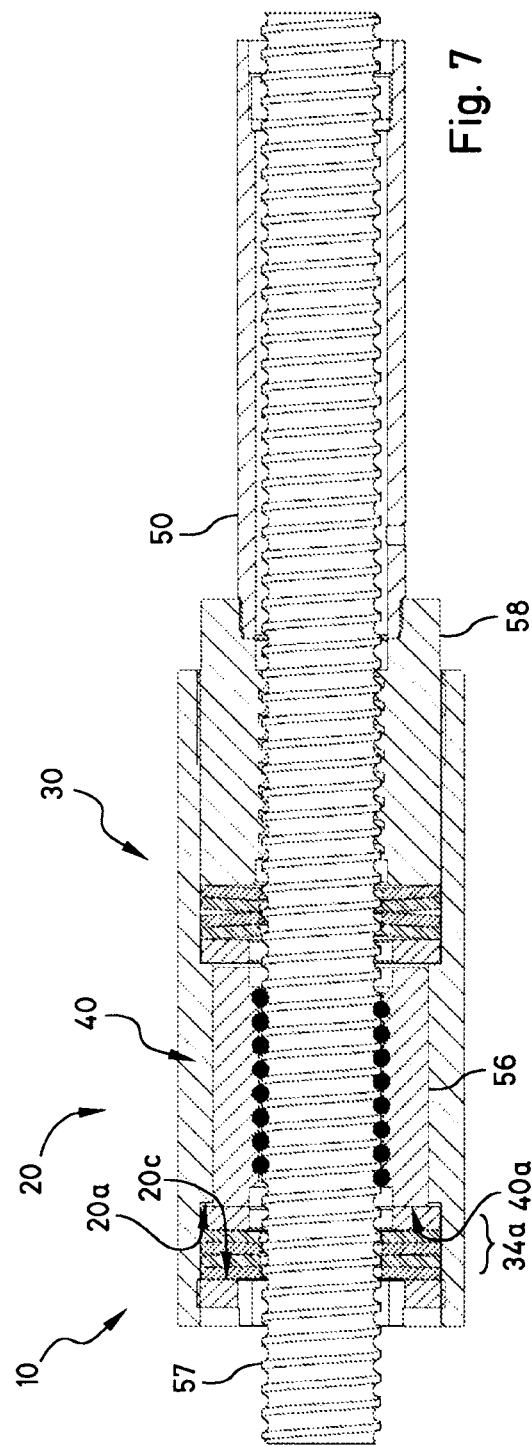

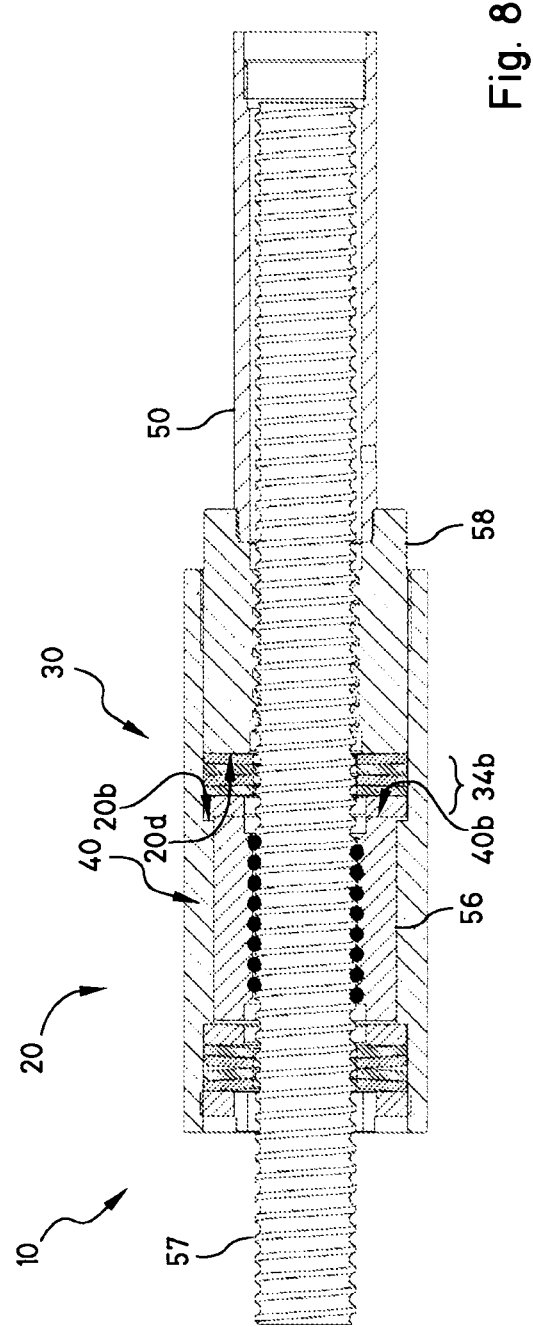

DAMPING SYSTEM AND LINEAR ACTUATOR

FIELD AND BACKGROUND OF THE INVENTION

The present invention relates to a damping system for a linear actuator, as well as a linear actuator.

Linear actuators are often used for moving machine elements or system parts, a rotational movement of a drive being able to be converted into a translational movement by said linear actuators. In this case, under some circumstances load peaks which damage the linear actuator may occur due to forces acting on a linear actuator. In particular, vibrations or impacts may have a negative effect on the mechanism of the linear actuator in the long term and shorten its service life. Thus damping systems which dampen the acting forces and which are able to reduce thereby the load on the linear actuator have been developed.

SUMMARY OF THE INVENTION

It is an object of the present invention to improve further the damping of forces in a linear actuator, in particular to provide a reliable dissipation of forces acting on the linear actuator, without impairing the regular operation of the actuator.

This object is achieved by a damping system for a linear actuator as well as a linear actuator as claimed in the independent claims.

Preferred embodiments form the subject of the dependent claims and the following description.

A damping system for a linear actuator according to a first aspect of the invention has a first sub-assembly with a first axial stop surface and a second axial stop surface.

According to the invention, a spring-elastic spring arrangement is provided, said spring-elastic spring arrangement in an initial position at a predetermined pretensioning being axially in contact with the first and second stop surface, in particular simultaneously. Additionally, a second sub-assembly is provided, said second sub-assembly being mounted so as to be axially displaceable relative to the first sub-assembly and being designed to lift the spring arrangement away from the first stop surface or from the second stop surface in the case of an axial movement relative to the first sub-assembly.

A sub-assembly within the meaning of the invention preferably comprises at least one component. Preferably, a sub-assembly is formed by a plurality of components. During normal operation of the actuator the components are expediently fixed relative to one another, for example rigidly connected to one another, and are movable relative to one another at best by the use of tools (for example by screwing into a thread and/or the like). It is also conceivable, however, that a sub-assembly comprises only a single component.

"Lifting away" within the meaning of the invention is preferably to be understood to mean interrupting or removing a contact. In other words, when lifting a component away from another component, the one component is spaced apart from the other component such that a gap is produced between the components.

An "axial stop surface" within the meaning of the invention is preferably a surface comprising a surface normal which is oriented parallel to a longitudinal axis and/or direction of movement and with which a component, in particular the spring arrangement, is axially in contact. Such an axial stop surface may be formed, for example, by a radial step or a radial projection which protrudes into a spring path of the spring arrangement.

One aspect of the invention is based on the approach of subjecting a spring-elastic spring arrangement to a predetermined pretensioning in a damping system for a linear actuator. Preferably, a first sub-assembly is provided to this end with a first stop surface and a second stop surface, the spring arrangement being supported thereon in an initial position, for example during normal operation of a linear actuator. The spring arrangement may be arranged, for example, such that in the initial position it is subjected to the pretensioning and makes contact with the first and second stop surface. Expediently, a second sub-assembly which is mounted so as to be axially displaceable relative to the first sub-assembly is additionally provided in order to actuate, for example to compress, the spring arrangement at least in some sections. The damping system in this case is advantageously configured such that a movement of the first sub-assembly relative to the second sub-assembly is only possible when the predetermined pretensioning is overcome.

The predetermined pretensioning is expediently set such that the spring arrangement is able to be compressed only when a nominal force, for example a permitted maximum force of the linear actuator, is exceeded by the second sub-assembly—and as a result is able to be lifted away from the first or second stop surface. It is possible for the spring arrangement to be able to be compressed, for example, by the second sub-assembly such that, with the action of an external force on the first sub-assembly or the second sub-assembly, an axial end of the spring arrangement loses contact with the first stop surface or the second stop surface.

By the pretensioned spring arrangement, the damping system may be prevented from oscillating in an unnecessary and potentially damaging manner. Sensitive components of the linear actuator, such as for example the supporting bearings, ball roller spindle, ball roller nut and/or the like, may thus be protected from excessive impacts or shocks. At the same time, however, it is also possible to preserve the stiffness of the linear actuator during regular operation, i.e. preferably up to the nominal force. Thus in spite of the integration of a damping system of the linear actuator, for example, machine elements or system parts may be accurately positioned.

In a preferred embodiment, the damping system, in particular the first sub-assembly and/or the spring arrangement and/or the second sub-assembly, is configured such that the second sub-assembly lifts the spring arrangement in a first direction away from the first stop surface in the case of an axial movement relative to the first sub-assembly, and in a second direction opposing the first direction away from the second stop surface in the case of an axial movement relative to the first sub-assembly. For example, the first sub-assembly and/or the spring arrangement and/or the second sub-assembly may be arranged relative to one another such that the spring arrangement is lifted away either from the first or the second stop surface as a function of the direction of movement.

In a further preferred embodiment, the second sub-assembly has a third axial stop surface and a fourth axial stop surface. Expediently, in the initial position at the predetermined pretensioning, the spring arrangement is axially in contact with the third stop surface and the fourth stop surface. The second sub-assembly is preferably configured such that the third or fourth stop surface permit a lifting of the spring arrangement away from the first or second stop surface and at the same time, for example, permit a compression of the spring arrangement at least in some sections. A reliable actuation of the spring arrangement may be achieved by means of the third and fourth axial stop surface.

In a further preferred embodiment, in the initial position the first stop surface is radially aligned with the third stop surface and the second stop surface is radially aligned with the fourth stop surface. In particular, the first and the third as well as the second and the fourth stop surface may define in each case a stop plane in the initial position. The spring arrangement thus may be supported on four stop surfaces. As a result, a uniform loading of all of the stop surfaces may be achieved.

In a further preferred embodiment, the first sub-assembly has a fifth stop surface and a sixth stop surface. Expediently, the spring arrangement is supported on the fifth and sixth stop surface at least at the predetermined pretensioning. The second sub-assembly in this case is preferably configured and/or arranged such that the contact between the spring arrangement and the fifth and sixth stop surface is not able to be interrupted by a movement of the second sub-assembly. Rather, the second sub-assembly may be configured and/or arranged in order to compress the spring arrangement against the fifth and sixth stop surface at least in some sections. As a result, the fifth and sixth stop surface may serve for setting the predetermined spring force. The provision of a fifth and sixth stop surface additionally permits a compact configuration of the damping system.

In a further preferred embodiment, in a loading position, for example under the action of a force on the first or second sub-assembly, the spring arrangement is spaced apart from the first or the second stop surface. The spacing set by means of the second sub-assembly between the spring arrangement, in particular an axial end of the spring arrangement, and the first or second stop surface expediently corresponds to a spring path of the spring arrangement. The spring arrangement is thus able to absorb in a reliable manner a load which acts on the damping system and which, for example, exceeds the nominal force of the linear actuator.

In a preferred embodiment, the spring arrangement has at least one, in particular rigid, support means and at least one elastic spring means. The elastic spring means is expediently supported on the at least one support means, at least at the predetermined pretensioning. In this case, the at least one support means is preferably designed, in particular is correspondingly arranged, to be in contact with the first or second stop surface. As a result, a reliable axial fixing of the spring means may be achieved. With a planar surface, the at least one support means may ensure a well-defined contact with the stop surfaces and, as a result, an effective force transmission without force peaks.

In a further preferred embodiment, the spring arrangement has at least one spring means which is configured as a plate spring assembly. The spring arrangement may have, for example, four plate springs which are layered to form two assemblies. Preferably, the spring arrangement has at least two, preferably four, such assemblies which in turn may be combined to form one or two plate spring groups. High levels of pretensioning may be set by means of such plate spring assemblies, even in the case of a compact design of the spring arrangement.

In a further preferred embodiment, the first stop surface and the second stop surface are arranged opposing one another, i.e. facing one another. Expediently, the spring arrangement is arranged between the first stop surface and the second stop surface. Preferably, the third and fourth stop surface are arranged opposing one another, wherein the spring arrangement may be arranged between the third and fourth stop surface. As a result, the spring arrangement may be of particularly compact construction in the axial direction. As a result, a use of the damping system is possible, for example, at the end of a thrust tube, in particular between the thrust tube and a joint head.

In a further preferred embodiment, the first stop surface and the second stop surface are oriented so as to face away from one another. Expediently, the first and second stop surface are arranged, in particular axially, between a first section of the spring arrangement and a second section of the spring arrangement. Preferably, the third and fourth stop surface are also oriented so as to face away from one another and are arranged between the first and second section of the spring arrangement. In other words, the first and second stop surface—and optionally also the third and fourth stop surface—are (axially) surrounded by the spring arrangement. In this case, the first and second section in each case may have at least one elastic spring means, for example a plate spring assembly. In this orientation of the first and second stop surface, the setting of the pretensioning of the spring arrangement may be facilitated, for example by dedicated pretensioning means. Additionally, the first and/or second sub-assembly may be of axially compact construction as a result. As a result, a use of the damping system is possible, for example, in the region of the mechanism of the linear actuator for converting a rotational movement into a translational movement, in particular on a spindle nut or ball roller nut.

In a further preferred embodiment, a pretensioning arrangement which is designed to set the predetermined pretensioning is provided. To this end, the pretensioning arrangement may have at least one pretensioning element, for example a safety nut or a slotted nut. This permits a pretensioning which may be set in a flexible manner. In particular, a setting according to use or a re-setting of the pretensioning is possible.

In a further preferred embodiment, the pretensioning arrangement has a thread mechanism, the spring arrangement being able to be compressed or decompressed at least in some sections by the actuation thereof. In particular, the at least one pretensioning element may be "screwed in" or "unscrewed". This permits an uncomplicated and rapid and at the same time particularly accurate setting of the pretensioning.

In a further preferred embodiment, a spacing between the first stop surface and the second stop surface is able to be varied, for example by the thread mechanism. The predetermined pretensioning may thus may particularly easily set.

In a further preferred embodiment, the second sub-assembly and the spring arrangement are arranged radially inside the first sub-assembly. In other words, the first sub-assembly may radially encompass the second sub-assembly and the spring arrangement. As a result, a particularly protected arrangement may be achieved of the spring arrangement and the second sub-assembly.

According to a second aspect of the invention, a linear actuator has a damping system according to the first aspect of the invention. The damping system is expediently integrated in a power train of the linear actuator. In other words, the damping system is expediently integrated in the linear actuator such that a flux of force occurring during operation runs through the damping system. As a result, the linear actuator may be prevented from oscillating, and the mechanism of the linear actuator for converting a rotational movement into a translational movement may be protected from significant impacts or shocks. At the same time, the linear actuator provides a high degree of stiffness such that an accurate positioning, even of heavy loads, is possible by means of the actuator.

In a preferred embodiment, the predetermined pretensioning is less than or equal to a nominal force of the linear actuator. In this case, a "nominal force" is preferably to be understood to mean the maximum force which the linear actuator is designed to exert. As a result, the production of a spring path in the power train of the linear actuator may be avoided until the nominal force is reached. In other words, up to the nominal force a high degree of stiffness of the linear actuator may be ensured.

In a further preferred embodiment, the linear actuator comprises a ball roller spindle, a ball roller nut operatively connected to the ball roller spindle, and a safety nut coupled to the ball roller nut, in particular via the spring arrangement. The spring arrangement in this case is expediently arranged between the ball roller nut and the safety nut, at least in some sections. As a result, it may be achieved that the safety nut is operatively connected to the ball roller spindle only with the action of a force which is greater than the predetermined pretensioning.

In a further preferred embodiment, the linear actuator comprises a ball roller spindle, a ball roller nut operatively connected to the ball roller spindle, and a nut housing in which the ball roller nut is arranged so as to be axially displaceable. In this case, the nut housing expediently forms at least one part of the first sub-assembly. In this case, the ball roller nut expediently forms at least one part of the second sub-assembly. The ball roller nut, in particular the ball rollers providing the operative connection between the ball roller spindle and the ball roller nut, may thereby be effectively protected from overload.

In a further preferred embodiment, the linear actuator comprises a thrust tube and a joint head. The damping system expediently has a housing which is rigidly connected to the thrust tube and which forms at least one part of the first sub-assembly. The joint head expediently forms at least one part of the second sub-assembly or is rigidly connected at least to the second sub-assembly. An overload acting on the joint head may be at least partially absorbed by the spring arrangement before it acts via the thrust tube on the mechanism of the linear actuator.

The invention is described in more detail below with reference to the figures. Insofar as expedient, elements which act in the same manner are provided herein with the same reference numerals. The invention is not limited to the exemplary embodiments shown in the figures—also not relative to the functional features. The previous description and the following description of the figures contain numerous features which in the dependent subclaims are shown partially combined together to form a plurality of features. The person skilled in the art, however, will also individually consider these features and all of the remaining features disclosed above and in the following description of the figures and combine them together to form further expedient combinations. In particular, in each case all of the aforementioned features are able to be combined together individually and in any suitable combination with the damping system according to the first aspect of the invention and the linear actuator according to the second aspect of the invention.

BRIEF DESCRIPTION OF THE FIGURES

FIG. 4 shows an example of a damping system for a linear actuator which has a first sub-assembly with two stop surfaces facing away from one another for a spring arrangement, in an initial position;

FIG. 5 shows an example of a damping system for a linear actuator which has a second sub-assembly which is rigidly connected to a spring arrangement;

FIG. 6 shows an example of a damping system for a linear actuator which has a first sub-assembly comprising a safety nut of the linear actuator;

FIG. 7 shows an example of the damping system of FIG. 6 in a first loading position; and FIG. 8 shows an example of the damping system of FIG. 6 in a second loading position.

DETAILED DESCRIPTION OF THE INVENTION

Figure 1:
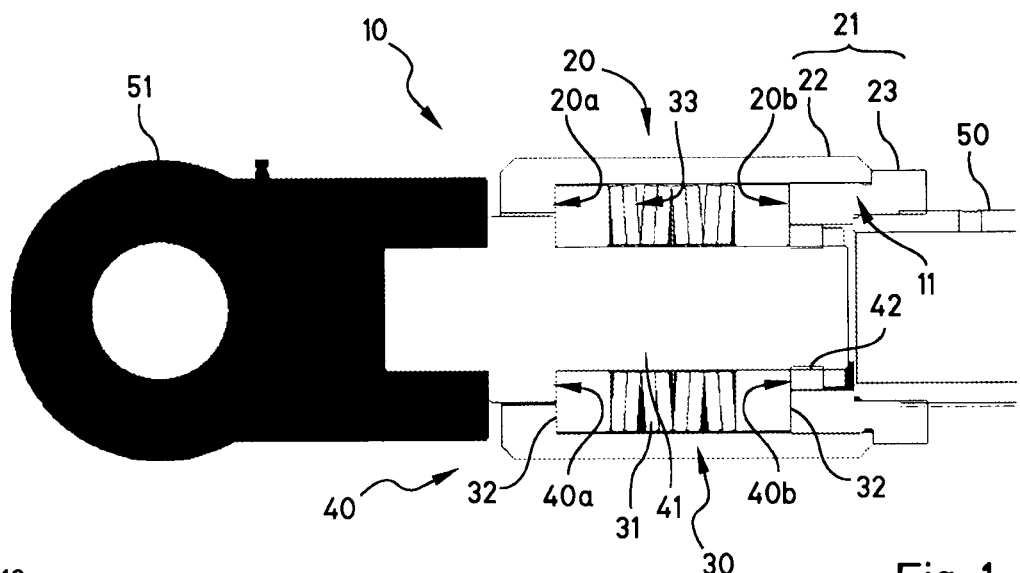
FIG. 1 shows an example of a damping system for a linear actuator which has a first sub-assembly with two stop surfaces facing one another for a spring arrangement, in an initial position.

FIG. 1 shows an example of a damping system 10 for a linear actuator which has a first sub-assembly 20 with two stop surfaces 20a, 20b facing one another for a pretensioned spring-elastic spring arrangement 30 in an initial position. The damping system 10 additionally comprises a second sub-assembly 40 which is mounted so as to be axially displaceable relative to the first sub-assembly 20, and which is designed to lift the spring arrangement 30 away from the first stop surface 20a or from the second stop surface 20b in the case of an axial movement relative to the first sub-assembly 20. To this end, the second sub-assembly 40 has two stop surfaces 40a, 40b facing one another.

In the example shown, the first sub-assembly 20 is rigidly connected to a thrust tube 50 of the linear actuator, for example screwed thereon. The second sub-assembly 40 is rigidly connected to a joint head 51 of the linear actuator. As a result, a flux of force is conducted from the joint head 51 to the thrust tube 50 or vice-versa via the spring arrangement 30, and sensitive components of the linear actuator such as the supporting bearings, ball roller spindle and/or ball roller nut are protected from force peaks.

In order to permit an accurate positioning of the joint head 51 by a linear movement of the thrust tube 50 in spite of the damping system 10, the spring arrangement 30 is expediently subjected to a predetermined pretensioning which advantageously corresponds substantially to a nominal force of the linear actuator. As a result, a further compression of the spring arrangement 30 between the first stop surface 20a and the fourth stop surface 40b when tension is applied to the joint head 51, or between the second stop surface 20b and the third stop surface 40a when pressure is applied to the joint head 51, may only occur when the acting force is greater than the nominal force—and thus potentially damaging to the components of the linear actuator.

For example, the spring arrangement 30 may have at least one elastic spring means 31 and two support means 32, the spring means 31 being able to be supported thereby on the first, second, third and/or fourth stop surface 20a, 20b, 40a, 40b. The spring means 31 expediently has at least one, in the example four, plate spring assemblies 33 consisting in each case of two layered plate springs, wherein for reasons of clarity, only one of the plate spring assemblies 33 is provided with a reference numeral. With a spring path of 8 mm, spring forces, for example in the region of 70 kN to 90 kN, may be produced by means of such plate spring assemblies 33. If the spring means 31 is clamped by a pretensioning of, for example, 50 kN between the first and second stop surface 20a, 20b, force impacts of between 50 kN and 70 to 90 kN may be damped, for example by a relative movement of up to 3 mm between the first and second sub-assembly 20, 40.

The pretensioning in the example shown may be set by varying the spacing between the first and second stop surface 20a, 20b. To this end, the first sub-assembly 20 may comprise a longitudinally adjustable housing 21, which has a housing sleeve 22 with an internal thread and a pretensioning element 23 with an external thread. The pretensioning element 23 is expediently configured as a locking nut which at least partially closes the housing sleeve 22 at an axial end, i.e. on one side. The housing sleeve 22 has in this case the first stop surface 20a and the pretensioning element 23 has the second stop surface 20b. The first stop surface 20a may be formed, for example, by an axial side surface of a radially internal projection or collar of the housing sleeve 22. The second stop surface 20b is expediently formed by an axial front face of the pretensioning element 23. The internal thread of the housing sleeve 22 and the external thread of the pretensioning element 23 may cooperate with one another and thereby form a thread mechanism of a pretensioning arrangement 11.

The damping system 10 is advantageously connected via the pretensioning element 23, in particular the locking nut, to the thrust tube 50, for example screwed onto the thrust tube 50.

In order to be able to adapt the second sub-assembly 40 to a change of the pretensioning—and a compression or relaxation of the spring means 31 optionally associated therewith—the second sub-assembly 40 comprises a projecting bolt 41 and a safety means 42, for example in the form of a slotted nut, which may be variably positioned on the bolt 41 in the axial direction. Whilst an axial side surface of the bolt collar may form the third stop surface 40a, expediently an axial front face of the safety means 42 forms the fourth stop surface 40b. The spacing between the third and fourth stop surface 40a, 40b thus may be set in a similar manner to the pretensioning arrangement 11 on the first sub-assembly 20. In particular, the spacing between the third and fourth stop surface 40a, 40b may be set such that, in the initial position shown, the first and third stop surface 20a, 40a and the second and fourth stop surface 20b, 40b in each case are aligned with one another. As a result, in the initial position an axial play of the second sub-assembly 40 and/or the spring arrangement 30 is avoided.

Figure 2:
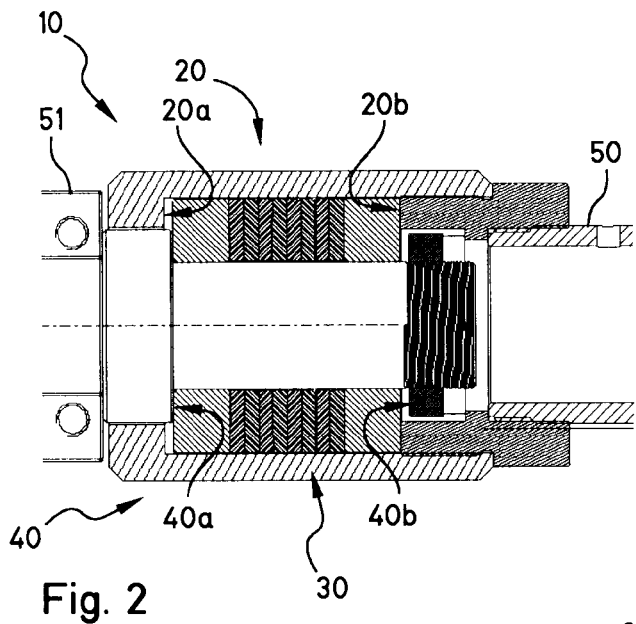
FIG. 2 shows an example of a damping system of FIG. 1 in a first loading position.

FIG. 2 shows an example of the damping system 10 of FIG. 1 in a first loading position in which a compressive force exceeding the predetermined pretensioning acts on the joint head 51 (only shown to a certain extent). In this case, the third stop surface 40a of the second sub-assembly 40 lifts the spring arrangement 30 away from the first stop surface 20a of the first sub-assembly 20. As a result, a flux of force from the joint head 51 via the third stop surface 40a may be implemented by the spring arrangement 30, and also via the second stop surface 20b onto the first sub-assembly 20 and thus onto the thrust tube 50. By the deflection of the second sub-assembly 40 relative to the first sub-assembly 20, in this case the fourth stop surface 40b is also lifted away from the spring arrangement 30. In each case, a gap is produced between the first stop surface 20a and the spring arrangement 30 and the fourth stop surface 40b and the spring arrangement 30, the size of said gap expediently corresponding to the spring path of the spring arrangement 30.

Figure 3:
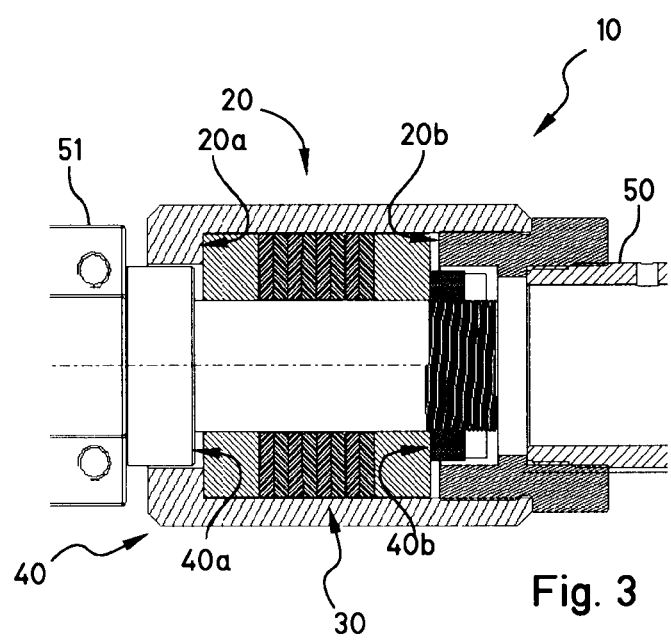
FIG. 3 shows an example of the damping system of FIG. 1 in a second loading position.

FIG. 3 shows an example of the damping system 10 of FIG. 1 in a second loading position, in which a tensile force exceeding the predetermined pretensioning acts on the joint head 51 (only shown to a certain extent). The fourth stop surface 40b of the second sub-assembly 40 in this case lifts the spring arrangement 30 away from the second stop surface 20b of the first sub-assembly 20. As a result, a flux of force from the thrust tube 50 to the first stop surface 20a may be implemented by the spring arrangement 30 and further via the fourth stop surface 40b onto the second sub-assembly 40 and thus onto the joint head 51. By the deflection of the second sub-assembly 40 relative to the first sub-assembly 20, in this case the third stop surface 40a is also lifted away from the spring arrangement 30. In each case, a gap is produced between the second stop surface 20b and the spring arrangement 30 and the third stop surface 40a and the spring arrangement 30, the size of said gap expediently corresponding to the spring path of the spring arrangement 30.

FIG. 4 shows an example of a damping system 10 for a linear actuator, which in an initial position has a first sub-assembly 20 with two stop surfaces 20a, 20b facing away from one another for a spring arrangement 30. The damping system 10 additionally comprises a second sub-assembly 40 which is mounted so as to be axially displaceable relative to the first sub-assembly 20 and which is designed to lift the spring arrangement 30 away from the first stop surface 20a or from the second stop surface 20b in the case of an axial movement relative to the first sub-assembly 20. To this end, the second sub-assembly 40 has two stop surfaces 40a, 40b facing away from one another.

In the example shown, the first sub-assembly 20 comprises a rotor 52 which is part of a drive of the linear actuator, and a nut housing 53 which is rigidly connected thereto, for example screwed thereon. The nut housing 53 is rotatably mounted via bearings 54 in a housing of the linear actuator (not shown) and axially fixed at the same time.

The second sub-assembly 40 is at least partially formed by a ball roller nut 56, which is arranged so as to be axially displaceable on the rotor 52 inside the nut housing 53. The ball roller nut 56 is operatively connected via ball rollers to a ball roller spindle 57 of the linear actuator. As a result, a flux of force is conducted from the ball roller spindle 57 to the nut housing 53—and via the bearings 54 as far as the housing of the linear actuator—or vice-versa via the spring arrangement 30, and sensitive components of the linear actuator such as the bearings 54, ball roller spindle 57 and/or ball roller nut 56 are protected from force peaks.

In the example shown, the spring arrangement 30 has two elastic spring means 31a, 31b in each case consisting of three plate spring assemblies 33, wherein each plate spring assembly 33 has two layered plate springs. For reasons of clarity, only one of the plate spring assemblies 33 is provided with a reference numeral. A first spring means 31a may be axially supported, with an end facing away from the first and third stop surface 20a, 40a, on a fifth stop surface 20c of the first sub-assembly 20. A second spring means 31b is expediently axially supported, with an end remote from the second and fourth stop surface 20b, 40b, on a sixth stop surface 20d of the first sub-assembly 20. In this case, the two spring means 31a, 31b are supported on the fifth or sixth stop surface 20c, 20d, not only in the initial position shown but preferably also in a loading position in which the second sub-assembly 40 is deflected relative to the first sub-assembly 20 and the first or second spring means 31a, 31b is compressed even further.

FIG. 5 shows an example of a damping system 10 for a linear actuator which has a second sub-assembly 40 which is rigidly connected to a spring arrangement 30. The damping system 10 also has a first sub-assembly 20 with two stop surfaces 20a, 20b, the second sub-assembly 40 being mounted so as to be axially displaceable relative thereto. The second sub-assembly 40 is at least partially formed by a thrust tube 50 of the linear actuator.

In the example shown, the first sub-assembly 20 comprises a nut housing 53 for a ball roller nut 56 of the linear actuator which is operatively connected to a ball roller spindle 57 via ball rollers. The nut housing 53 projects radially inwardly at one end. In this case, an axial side surface of the collar forms the first stop surface 20a.

The first sub-assembly 20 preferably also comprises a pretensioning element 23, in the present example in the form of a slotted nut which is screwed via an internal thread of the nut housing 53 into the nut housing 53. In this case, the slotted nut may serve as a locking nut which at least partially closes the nut housing 53 axially on one side. An axial side surface of the pretensioning element 23 forms the second stop surface 20b. The nut housing 53 forms together with the pretensioning element 23 a pretensioning arrangement 11 with a thread mechanism for setting a predetermined pretensioning of the spring arrangement 30.

In addition to an elastic spring means 31 in the from of three plate spring assemblies 33, in each case consisting of two plate springs, the spring arrangement 30 also comprises a support means 32, the spring means 31 being able to be supported thereon at the predetermined pretensioning. In the present case, the support means 32 is configured as a safety nut 58 which may be brought into cooperation with the ball roller spindle 57 when the cooperation between the ball roller spindle 57 and the ball roller nut 56 is impaired, for example with the destruction of the ball rollers, and as a result an uncontrolled axial movement of the ball roller spindle 57 relative to the ball roller nut 56 or the nut housing 53 may be prevented.

If a compressive load, which is greater than a nominal force of the linear actuator, acts on the thrust tube 50 there is the risk of damage, for example, to the ball rollers or bearings, not shown, of the nut housing 53 (see FIG. 4). Thus the pretensioning is preferably set to be substantially equal to the nominal force. In the case of a compressive load on the thrust tube 50 exceeding the predetermined pretensioning, the spring arrangement 30 may be compressed and thus the safety nut 58 may be brought into an operative connection with the ball roller spindle 57. Thus it is possible to avoid an overload, in particular of the ball rollers.

FIG. 6 shows an example of a damping system 10 for a linear actuator which has a first sub-assembly 20 with four stop surfaces 20a, 20b, 20c, 20d, comprising a safety nut 58 of the linear actuator. The damping system 10 additionally comprises a spring arrangement 30 with two spring means 31a, 31b and a second sub-assembly 40 with two stop surfaces 40a, 40b. In the present example, the damping system 10 is located in an initial position in which the spring arrangement 30 bears against the first and third stop surfaces 20a, 40a which are aligned with one another and against the second and fourth stop surface 20b, 40b which are aligned with one another.

The first sub-assembly 20 has in addition to the safety nut 58 a nut housing 53 and a pretensioning element 23, wherein the safety nut 58 and the pretensioning element 23 are screwed into the nut housing 53, at opposing ends thereof. In this case, an axial side surface of the pretensioning element 23 forms the fifth stop surface 20c and an axial front surface of the safety nut 58 forms the sixth stop surface 20d. In this case, the spring arrangement 30 is arranged in some sections between the fifth and first stop surface 20c, 20a and between the second and sixth stop surface 20b, 20d of the first sub-assembly 20.

The safety nut 58 and the nut housing 53 and the pretensioning element 23 and the nut housing 53 form in each case a pretensioning arrangement 11 by which the spring arrangement 30 is able to be subjected to a predetermined pretensioning. In this case, the pretensioning of a first section 34a of the spring arrangement 30, which comprises the first spring means 31a, may be increased by screwing the pretensioning element 23 into the nut housing 53, or may be reduced by unscrewing. Similarly, the pretensioning of a second section 34b of the spring arrangement 30, which comprises the second spring means 31b, may be increased by screwing the safety nut 58 into the nut housing 53, or may be reduced by unscrewing.

The second sub-assembly 40 has a ball roller nut 56 which is mounted so as to be axially displaceable in the nut housing 53 and which is operatively connected via ball rollers to a ball roller spindle 57 of the linear actuator. Axial end faces or front faces of the ball roller nut 56 form the third and fourth stop surface 40a, 40b. As a result, during operation of the linear actuator, in which the rotational movement of the ball roller spindle 57 is converted into a translational movement of the ball roller nut 56, a force which corresponds to the movement and which does not exceed the predetermined pretensioning may be transmitted via the spring arrangement 30 to the first sub-assembly 20 and also for example to a component rigidly connected to the first sub-assembly 20, for example a thrust tube 50 screwed into the safety nut 58. Thus, for example, a machine element coupled to the thrust tube 50 may be accurately positioned.

The pretensioning of the spring arrangement 30 is preferably set to be substantially equal to or greater than a nominal force of the linear actuator. Thus with a tensile load or compressive load exceeding the predetermined pretensioning on the thrust tube 50, for example by a load peak such as an impact, the spring arrangement 30 may be compressed in one of the sections 34a, 34b and thus the safety nut 58 may be brought into an operative connection with the ball roller spindle 57. These cases are shown in FIGS. 7 and 8.

FIG. 7 shows an example of the damping system 10 of FIG. 6 in a first loading position in which a tensile force exceeding the predetermined pretensioning of the spring arrangement 30 acts on the thrust tube 50. In this case, the tensile force acts via the fifth stop surface 20c of the first sub-assembly 20 onto the first section 34a of the spring arrangement 30, which is supported in this section 34a on the third stop surface 40a of the second sub-assembly 40 and correspondingly compressed. Thus the second sub-assembly 40 lifts the first section 34a of the spring arrangement 30 away from the first stop surface 20a.

By the compression of the spring arrangement 30 in the first section 34a, an axial deflection of the first sub-assembly 20 is produced relative to the second sub-assembly 40. As a result, the safety nut 58 may be brought into an operative connection with the ball roller spindle 57 and may prevent an increase in the loading of the operative connection between the ball roller nut 56 and ball roller spindle 57, in particular the ball rollers, significantly beyond the predetermined pretensioning.

FIG. 8 shows an example of the damping system 10 of FIG. 6 in a second loading position, in which a compressive force exceeding the predetermined pretensioning of the spring arrangement 30 acts on the thrust tube 50. In this case, the compressive force acts via the sixth stop surface 20d of the first sub-assembly 20 onto the second section 34b of the spring arrangement 30, which in this section 34b is supported on the fourth stop surface 40b of the second sub-assembly 40 and is correspondingly compressed. Thus the second sub-assembly 40 lifts the second section 34b of the spring arrangement 30 away from the second stop surface 20b.

An axial deflection of the first sub-assembly 20 relative to the second sub-assembly 40 is produced by the compression of the spring arrangement 30 in the second section 34b. As a result, the safety nut 58 may be brought into an operative connection with the ball roller spindle 57 and may prevent an increase in the loading of the operative connection between the ball roller nut 56 and the ball roller spindle 57, in particular the ball rollers, significantly beyond the predetermined pretensioning.

LIST OF REFERENCE NUMERALS

10 Damping system
11 Pretensioning arrangement
20 First sub-assembly
20a First stop surface
20b Second stop surface
20c Fifth stop surface
20d Sixth stop surface
21 Housing
22 Housing sleeve
23 Pretensioning element
30 Spring arrangement
31 Spring means
31a First spring means
31b Second spring means
32 Support means
33 Plate spring assembly
34a First section
34b Second section
40 Second sub-assembly
40a Third stop surface
40b Fourth stop surface
41 Bolt
42 Securing means
50 Thrust tube
51 Joint head
52 Rotor
53 Nut housing
54 Bearing
56 Ball roller nut
57 Ball roller spindle
58 Safety nut

The invention claimed is:

1. A damping system for a linear actuator, the damping system comprising:
a first sub-assembly with a first axial stop surface and a second axial stop surface;
a spring-elastic spring arrangement being axially in contact with said first and second stop surfaces in an initial position at a predetermined pretensioning; and
a second sub-assembly being mounted axially displaceable relative to said first sub-assembly, and said second sub-assembly being configured to lift said spring arrangement away from said first stop surface or from said second stop surface during an axial movement relative to said first sub-assembly;
wherein said second sub-assembly has a third axial stop surface and a fourth axial stop surface, and in said initial position at the predetermined pretensioning said spring arrangement is axially in contact with said third stop surface and said fourth stop surface.

2. The damping system according to claim 1, wherein in said initial position said first stop surface is radially aligned with said third stop surface and said second stop surface is radially aligned with said fourth stop surface.

3. The damping system according to claim 1, wherein said first sub-assembly has a fifth stop surface and a sixth stop surface, and said spring arrangement is supported thereon at least at the predetermined pretensioning.

4. The damping system according to claim 1, wherein in a loading position said spring arrangement is spaced apart from said first or said second stop surface.

5. The damping system according to claim 1, wherein said spring arrangement has at least one support and at least one elastic spring supported on said at least one support, at least at the predetermined pretensioning, and said at least one support is configured to be in contact with said first or second stop surface.

6. The damping system according to claim 1, wherein said spring arrangement has at least one spring which is configured as a plate spring assembly.

7. The damping system according to claim 1, wherein said first stop surface and said second stop surface are disposed opposite one another and said spring arrangement is disposed between said first stop surface and said second stop surface.

8. The damping system according to claim 1, wherein said first stop surface and said second stop surface are oriented facing away from one another and are disposed between a first section of said spring arrangement and a second section of said spring arrangement.

9. The damping system according to claim 1, further comprising a pretensioning device configured to set the predetermined pretensioning.

10. The damping system according to claim 9, wherein said pretensioning device has a thread mechanism, and said spring arrangement is configured to be compressed or decompressed at least in some sections by an actuation of said pretensioning arrangement.

11. The damping system according to claim 1, wherein said first stop surface and said second stop surface are disposed at a variable spacing.

12. The damping system according to claim 1, wherein said second sub-assembly and said spring arrangement are disposed radially inside said first sub-assembly.

13. A linear actuator having a damping system according to claim 1.

14. The linear actuator according to claim 13, wherein the predetermined pretensioning is less than or equal to a nominal force of the linear actuator.

15. The linear actuator according to claim 13, further comprising a ball roller spindle, a ball roller nut operatively connected to said ball roller spindle, and a safety nut coupled to said ball roller nut, wherein said spring arrangement is arranged between said ball roller nut and said safety nut, at least in some sections.

16. The linear actuator according to claim 13, further comprising a ball roller spindle, a ball roller nut operatively connected to said ball roller spindle, and a nut housing in which said ball roller nut is disposed and configured to be axially displaceable, wherein said nut housing forms at least one part of said first sub-assembly and said ball roller nut forms at least one part of said second sub-assembly.

17. The linear actuator according to claim 13, further comprising a thrust tube and a joint head, wherein the damping system has a housing which is rigidly connected to said thrust tube and which forms at least one part of said first sub-assembly and said joint head forms at least one part of said second sub-assembly or is rigidly connected at least to said second sub-assembly.

18. A linear actuator comprising a damping system, a thrust tube, and a jint head, said damping system including:
- a first sub-assembly with a first axial stop surface and a second axial stops surface;
- a spring-elastic spring arrangement being axially in contact with said first and second stop surfaces in an initial position at a predetermined pre-tensioning;
- a second sub-assembly being mounted axially displaceable relative to said first sub-assembly, and said second sub-assembly being configured to lift said spring arrangement away from said first stop surface or from said second stop surface during an axial movement relative to said first sub-assembly; and
- a housing which is rigidly connected to said thrust tube and which forms at least one part of said first sub-assembly and said joint head forms at least one part of said second sub-assembly or is rigidly connected at least to said second sub-assembly.

\* \* \* \* \*